United States Patent
Rivera et al.

(10) Patent No.: US 11,618,477 B2
(45) Date of Patent: Apr. 4, 2023

(54) SERVICE AREA MAPS FOR AUTONOMOUS VEHICLES

(71) Applicant: WAYMO LLC, Mountain View, CA (US)

(72) Inventors: Carlos Rivera, Milpitas, CA (US); Austin Abrams, Redwood City, CA (US); David Yonchar Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 47 days.

(21) Appl. No.: 16/930,644

(22) Filed: Jul. 16, 2020

(65) Prior Publication Data

US 2022/0017116 A1    Jan. 20, 2022

(51) Int. Cl.
*B60W 60/00*       (2020.01)
*G01C 21/34*       (2006.01)
*G01C 21/00*       (2006.01)

(52) U.S. Cl.
CPC ..... *B60W 60/0025* (2020.02); *G01C 21/3461* (2013.01); *G01C 21/3807* (2020.08)

(58) Field of Classification Search
None
See application file for complete search history.

(56) References Cited

U.S. PATENT DOCUMENTS

| | | | | |
|---|---|---|---|---|
| 5,506,897 A | * | 4/1996 | Moore | H04Q 3/0029 379/220.01 |
| 5,737,731 A | * | 4/1998 | Lester | H04W 64/00 701/13 |
| 10,453,226 B1 | * | 10/2019 | Burrows | G01C 21/3682 |
| 2014/0107921 A1 | * | 4/2014 | Delling | G01C 21/3446 701/533 |
| 2018/0259966 A1 | | 9/2018 | Long | |
| 2018/0373941 A1 | | 12/2018 | Kwant et al. | |
| 2019/0163992 A1 | * | 5/2019 | Mahon | G01J 1/44 |
| 2019/0170520 A1 | | 6/2019 | Colijn et al. | |
| 2020/0378780 A1 | * | 12/2020 | Beaurepaire | G01C 21/3697 |

FOREIGN PATENT DOCUMENTS

| | | | | |
|---|---|---|---|---|
| CN | 106097450 A | * | 11/2016 | |
| JP | 3604312 B2 | * | 12/2004 | G06T 15/50 |
| WO | WO-2018126228 A1 | * | 7/2018 | G05D 1/0088 |

* cited by examiner

*Primary Examiner* — Hunter B Lonsberry
*Assistant Examiner* — Paysun Wu
(74) *Attorney, Agent, or Firm* — Botos Churchill IP Law

(57) ABSTRACT

Aspects of the disclosure provide for the generation of a service area map for autonomous vehicles. For instance, graph nodes of a road network may be iterated through in order to identify a set of reachable graph nodes based on a set of routing parameters that define driving limits for the autonomous vehicles. The road network may include the graph nodes as well as edges connecting ones of the graph nodes. A set of S2 cells may be identified based on the set of reachable graph nodes. Vertices of each S2 cell of the set of S2 cells may be determined based on whether each S2 cell of the set of S2 cells is occupied by any of the graph nodes of the set of reachable graph nodes. Contours through cells may be drawn based on the scores. The service area map may be generated using the contours.

22 Claims, 16 Drawing Sheets

SERVICE AREA MAPS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or drop off location, and the vehicle maneuvers itself to that location. In some instances, a vehicle may be restricted to one or more service areas. A service area may define an area where a vehicle is able or permitted to drive and provide trip services for passengers and/or cargo.

Approaches for drawing areas of maps for such service areas involved a time-consuming process where human operators would review map information, capabilities of the autonomous vehicles, and draw a polygon. Such manual processes may be error prone, that is, humans may tend to make inadvertent errors by cutting off cul-de-sacs or leaving off areas that could have been included. Moreover, as the capabilities of such autonomous vehicles change overtime, manual processes can cause significant delays in updating the service areas. In addition, such manual approaches are not scalable and may require visual inspection and confirmation of accuracy by visiting each of the locations in the polygon.

BRIEF SUMMARY

Aspects of the disclosure provide a method for generating a service area map for autonomous vehicles. The method includes iterating, by one or more processors, through graph nodes of a road network in order to identify a set of reachable graph nodes based on a set of routing parameters that define driving limits for the autonomous vehicles, wherein the road network includes the graph nodes as well as edges connecting ones of the graph nodes; identifying, by the one or more processors, a set of S2 cells based on the set of reachable graph nodes; scoring, by the one or more processors, vertices of each S2 cell of the set of S2 cells based on whether each S2 cell of the set of S2 cells is occupied by any of the graph nodes of the set of reachable graph nodes; drawing, by the one or more processors, contours through cells based on the scores; and generating, by the one or more processors, the service area map using the contours.

In one example, the set of routing parameters include an ability to reach one graph node of the set of reachable graph nodes from all other graph nodes of the set of reachable graph nodes. In another example, the set of routing parameters includes avoiding certain driving maneuvers. In another example, the set of routing parameters includes avoiding certain areas of the graph nodes. In another example, identifying the set of S2 cells includes identifying a subset of set of the reachable graph nodes having extreme latitude and longitude values. In another example, scoring vertices includes initially setting all vertices of each S2 cell of the set of S2 cells to a first value and adjusting values of any vertices of S2 cells of the set of S2 cells that are occupied by any graph nodes of the set of reachable graph nodes. In this example, drawing the contours includes dividing a cell of the set of S2 cells by dividing vertices with the first value from vertices of adjusted values. In addition, drawing the contours includes drawing a contour with a particular direction to indicate which portion of the divided cell includes vertices of the first value and which portion of the divided cell includes vertices of adjusted values. In another example, the service area map includes a plurality of polygons. In this example, a first one of the plurality of polygons includes an excluded area within a second one of the plurality of polygons, such that an area between the first one and the second one is a drivable area.

Another aspect of the disclosure provides a system for generating a service area map for autonomous vehicles. The system includes one or more processors configured to iterate through graph nodes of a road network in order to identify a set of reachable graph nodes based on a set of routing parameters define driving limits for the autonomous vehicles, wherein the road network includes the graph nodes as well as edges connecting ones of the graph nodes; identify a set of S2 cells based on the set of reachable graph nodes; score vertices of each S2 cell of the set of S2 cells based on whether each S2 cell of the set of S2 cells is occupied by any of the graph nodes of the set of reachable graph nodes; draw contours through cells based on the scores; and generate the service area map using the contours.

In one example, the set of routing parameters include an ability to reach one graph node of the set of reachable graph nodes from all other graph nodes of the set of reachable graph nodes. In another example, the set of routing parameters includes avoiding certain driving maneuvers. In another example, the set of routing parameters includes avoiding certain areas of the graph nodes. In another example, identifying the set of S2 cells includes identifying a subset of set of the reachable graph nodes having extreme latitude and longitude values. In another example, the one or more processors are further configured to score vertices by initially setting all vertices of each S2 cell of the set of S2 cells to a first value and adjusting values of any vertices of S2 cells of the set of S2 cells that are occupied by any graph nodes of the set of reachable graph nodes. In this example, the one or more processors are further configured to draw the contours by dividing a cell of the set of S2 cells by dividing vertices with the first value from vertices of adjusted values. In addition, the one or more processors are further configured to draw the contours by drawing a contour with a particular direction to indicate which portion of the divided cell includes vertices of the first value and which portion of the divided cell includes vertices of adjusted values. In another example, the service area map includes a plurality of polygons. In this example, a first one of the plurality of polygons includes an excluded area within a second one of the plurality of polygons, such that an area between the first one and the second one is a drivable area.

DETAILED DESCRIPTION

Overview

Figure 1:
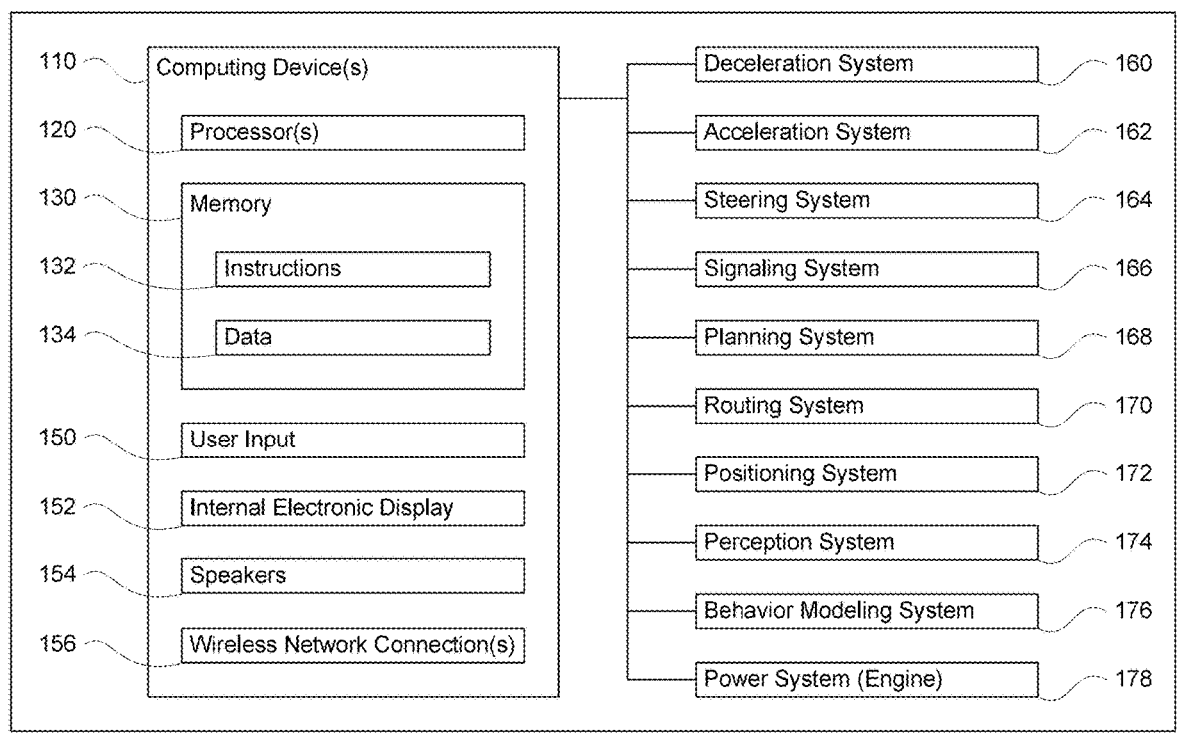
FIG. 1 is a functional diagram of an example vehicle in accordance with an exemplary embodiment.

The technology relates to determining service area maps for autonomous vehicles. As noted above, prior approaches for drawing areas of maps for such service areas involved a time-consuming process where human operators would review map information, capabilities of the autonomous vehicles, and draw a polygon. Such manual processes may be error prone, that is, humans may tend to make inadvertent errors by cutting off cul-de-sacs or leaving off areas that could have been included. Moreover, as the capabilities of such autonomous vehicles change overtime, manual processes can cause significant delays in updating the service areas. In addition, such manual approaches are not scalable and may require visual inspection and confirmation of accuracy by visiting each of the locations in the polygon.

To address these drawbacks, an automated process may be used. The automated process may begin by producing a set of graph nodes on a road network that are reachable given a set of routing parameters. For instance, the road network may include a plurality of graph nodes representing locations in lanes which are connected by edges. To determine which graph nodes are reachable, one or more server computing devices may iterate through all graph nodes in the graph, and for each graph node, identify every other graph node that is reachable from that graph node.

The result of the iterations may be one or more sets of reachable graph nodes (and edges) each corresponding to a different possible service area for the autonomous vehicles. In order to generate a map representative of these different possible service areas, each set of reachable graph nodes may be processed to identify the extreme graph nodes, or rather, a subset of the set of reachable graph nodes having the most maximum and minimum latitudes and longitudes.

Each vertex of the grid may be scored or assigned a numerical value based on whether the cell to which the vertex belongs includes a graph node or an edge. Contour lines may be drawn on the cells having a heterogeneous mix of positive and non-positive vertices so as to separate the two types of vertices. In other words, the contour lines may be drawing to divide cells to separate positive values from non-positive values. The contour lines may be joined to one another in order to form polygons that encompass a service area. Rules or heuristics may be used to determine which side of a cell should be included in the polygon or not included.

Each time the graph nodes and/or the scoping restrictions are updated, the process may be updated. This may enable operators to understand how changes to the graph nodes and/or the scoping restrictions, such as by removing an intersection or a turn, can affect service areas. In addition, operators may be able to more readily identify problematic areas of the service areas which may enable the operators to find out ways to expand the service area.

The features described herein may provide for a useful and practical approach to automatically determining service areas for autonomous vehicles. The resulting maps of service areas may then be used to help human operators as well as users of the service to better understand these service areas. In addition, the automated process described herein can be run anytime there is a change, which may not only improve the reliability of maps used by a transportation service, but may also enable operators to understand how changes to the graph nodes and/or the scoping restrictions can affect service areas.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2A:
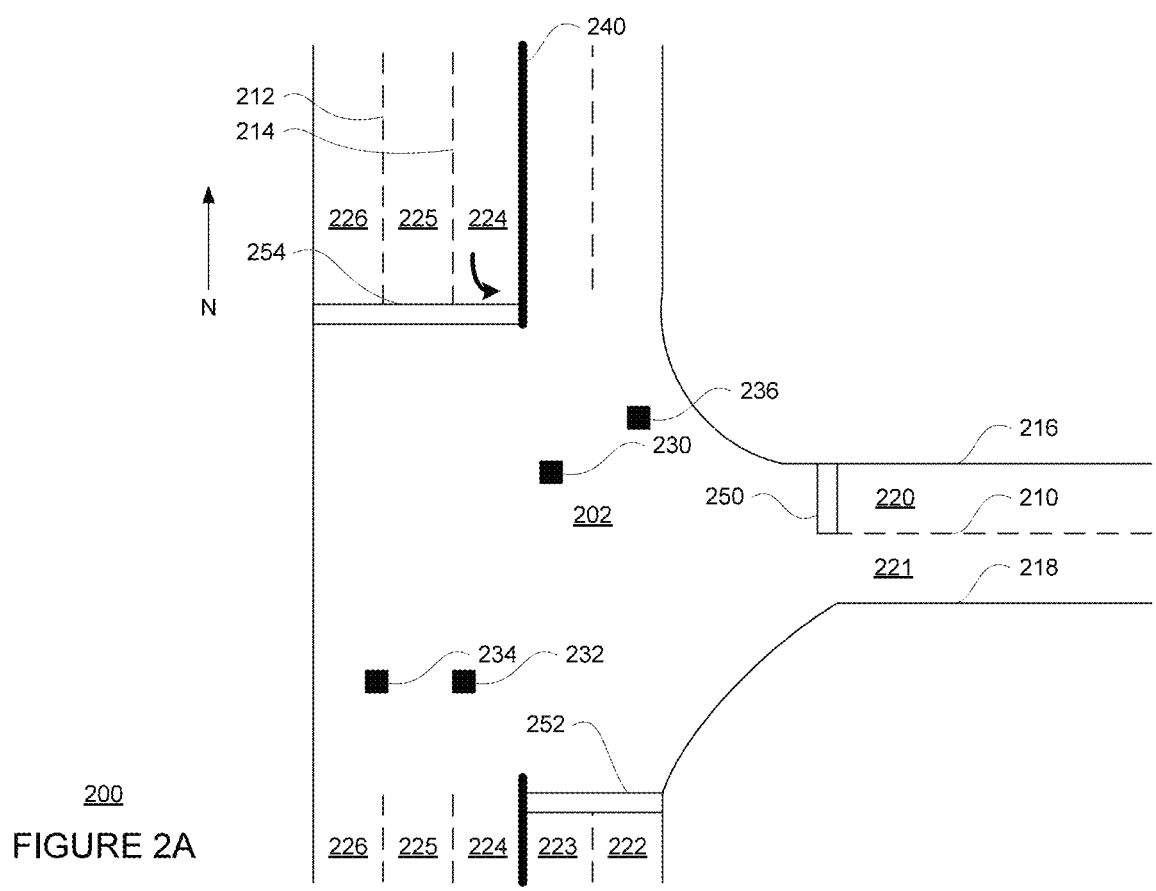
FIGS. 2A-2B are an example of map information in accordance with aspects of the disclosure.
Figure 2B:
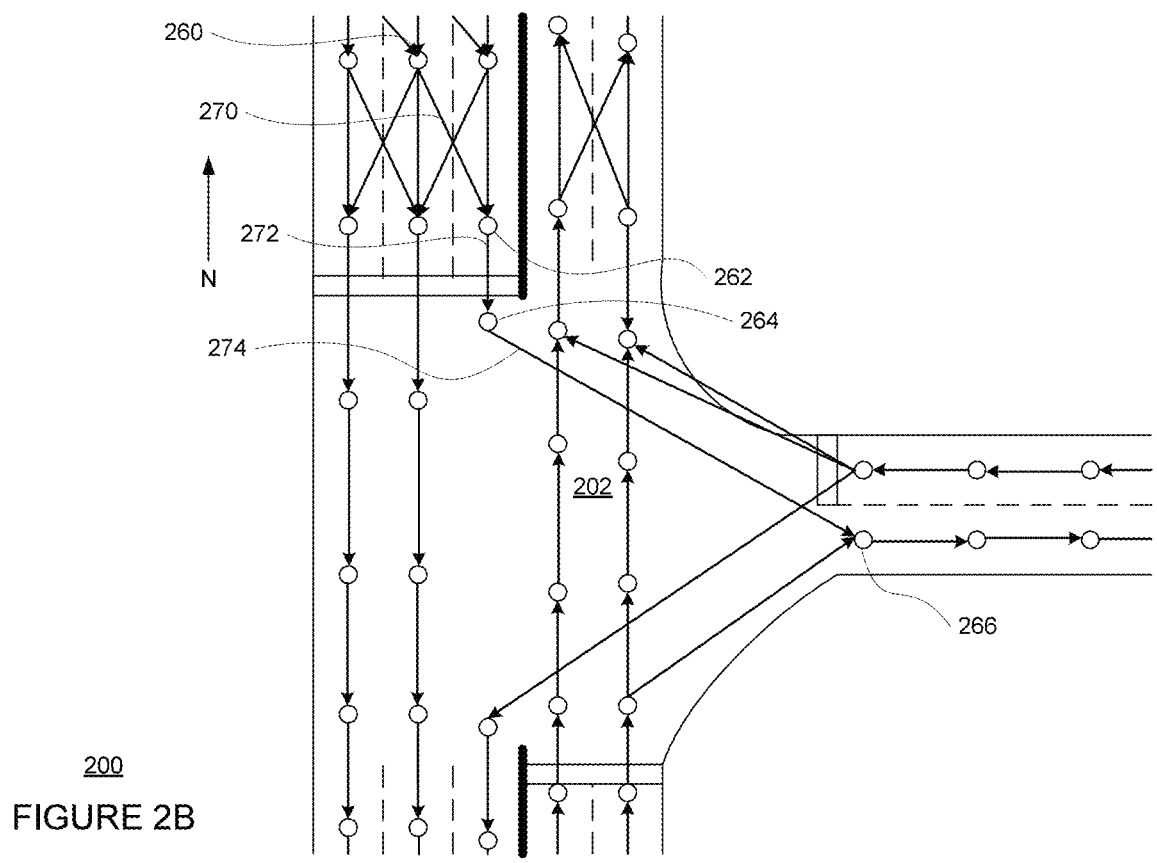

FIGS. 2A and 2B are an example of map information 200 for a small section of roadway including intersection 202. FIG. 2A depicts a portion of the map information 200 that includes information identifying the shape, location, and other characteristics of lane markers or lane lines 210, 212, 214, 216, 218, lanes 220, 221, 222, 223, 224, 225, 226, traffic control devices 230, 232, 234, 236 (not depicted in FIG. 2B for clarity), median 240, as well as stop lines 250, 252, 254. In this example, lane 224 approaching intersection 202 is a left turn only lane. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

For instance, FIG. 2B depicts most of the map information of FIG. 2A with the addition of a plurality of edges represented by arrows and graph nodes (depicted as circles) corresponding to the road network of map information 200. Though many edges and graph nodes are depicted, only a few are referenced for clarity and simplicity. For example, FIG. 2B includes edges 270, 272, 274 arranged between pairs of starting and ending graph nodes as graph nodes 260, 262, 264, 266. As can be seen, graph nodes 260 represents a starting point for edge 270, and graph nodes 262 represents an ending point for edge 270. Similarly, graph node 262 represents a starting point for edge 272, and graph node 264 represents an ending point for edge 272. In addition, graph node 264 represents a starting point for edge 274, and graph node 266 represents an ending point for edge 274. Again, the direction of each of these graph nodes is represented by the arrow of the edge. Edge 270 may represent a path a vehicle can follow to change from lane 226 to lane 224, edge 272 may represent a path that a vehicle can follow within lane 224, and edge 274 may represent a path a vehicle can follow to make a left turn at intersection 202 in order to move from lane 224 to lane 222. Although not shown, each of these edges may be associated with an identifier, for instance, a numeric value corresponding to a relative or actual location of the edge or simply the locations of the starting and ending graph nodes. In this regard, edges and graph nodes may be used to determine how to route and plan trajectories between locations, change lanes and make other maneuvers, though in operation, the vehicle 100 need not follow the edges exactly.

Positioning system 170 may be used by autonomous control system 176 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
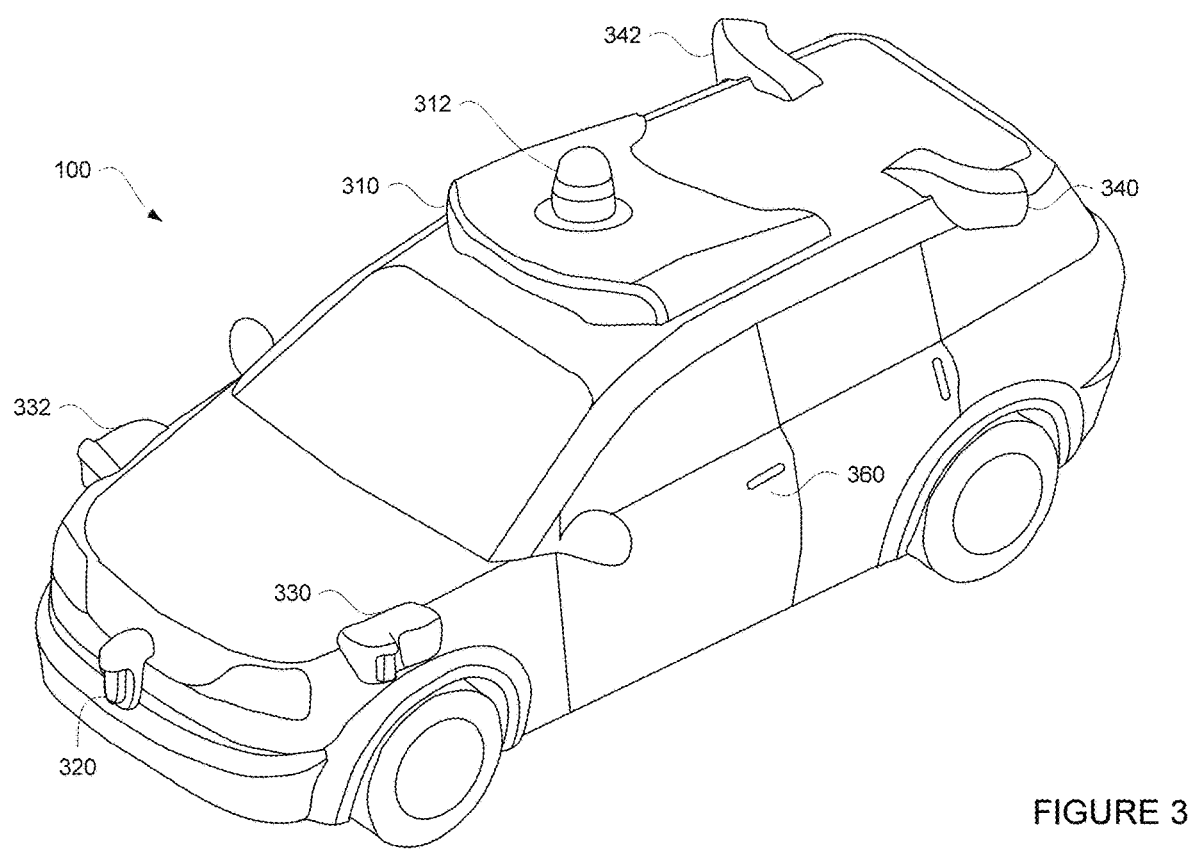
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may be capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planning system 168, positioning system 170, perception system 172, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a route generated by a routing module of the routing system 166. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168. The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
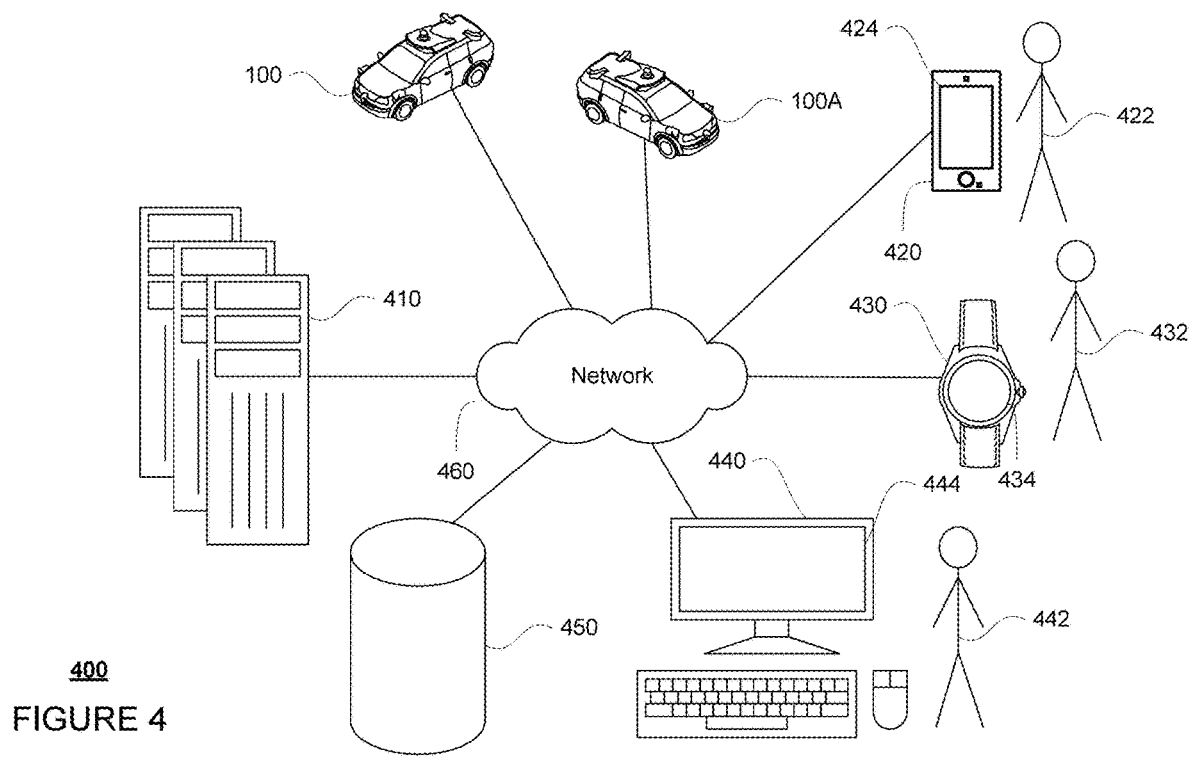
FIG. 4 is a pictorial diagram of an example system in accordance with aspects of the disclosure.
Figure 5:
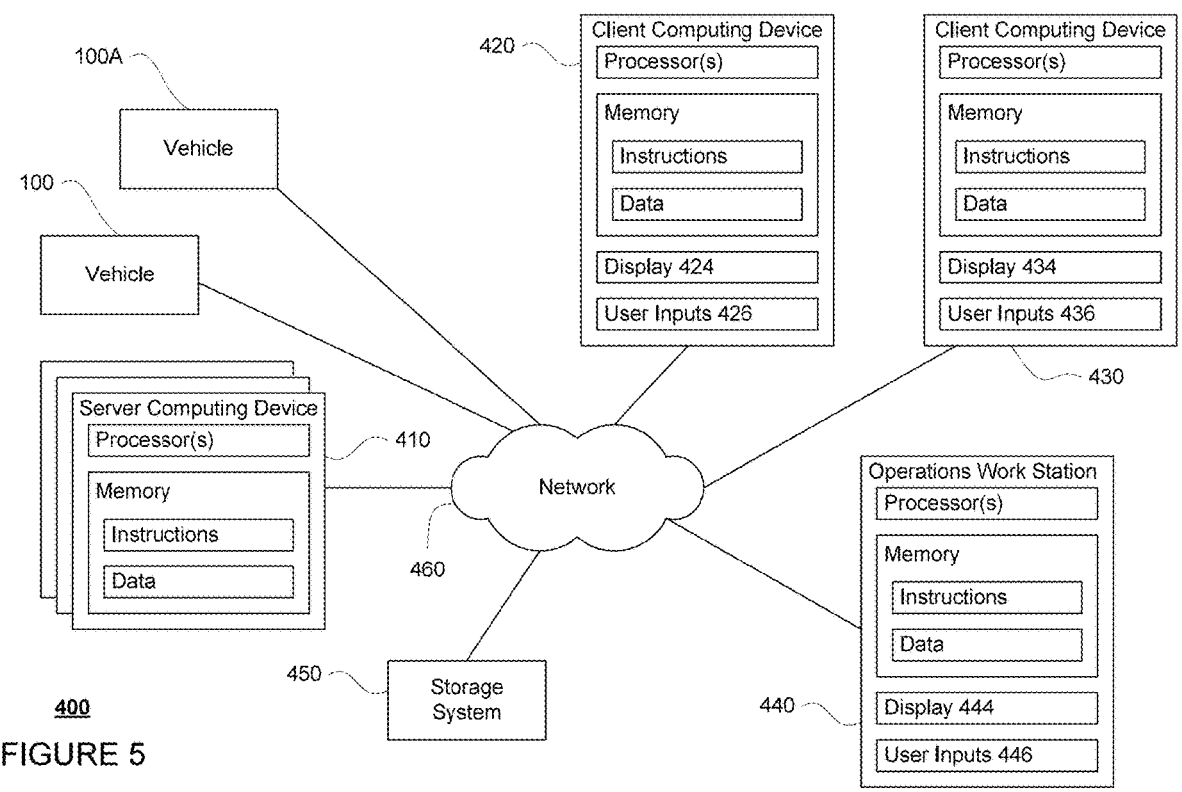
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage system 450 may also store the aforementioned autonomous vehicle control software which is to be used by vehicles, such as vehicle 100, to operate a vehicle in an autonomous driving mode. In addition, the storage system 450 may store the aforementioned map information, various representations of geographic areas defined by S2 cells at one or more levels, as well as service area maps and other information discussed below. The S2 cells may be used to represent areas of a curved surface such as the Earth at different levels of granularity (e.g. levels 0 to 30, level 0 having the largest average cell size and level 30 having the smallest average cell size). In this regard, each S2 cell represents a region and corresponding visual representation of that region, e.g. a map tile.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 14:
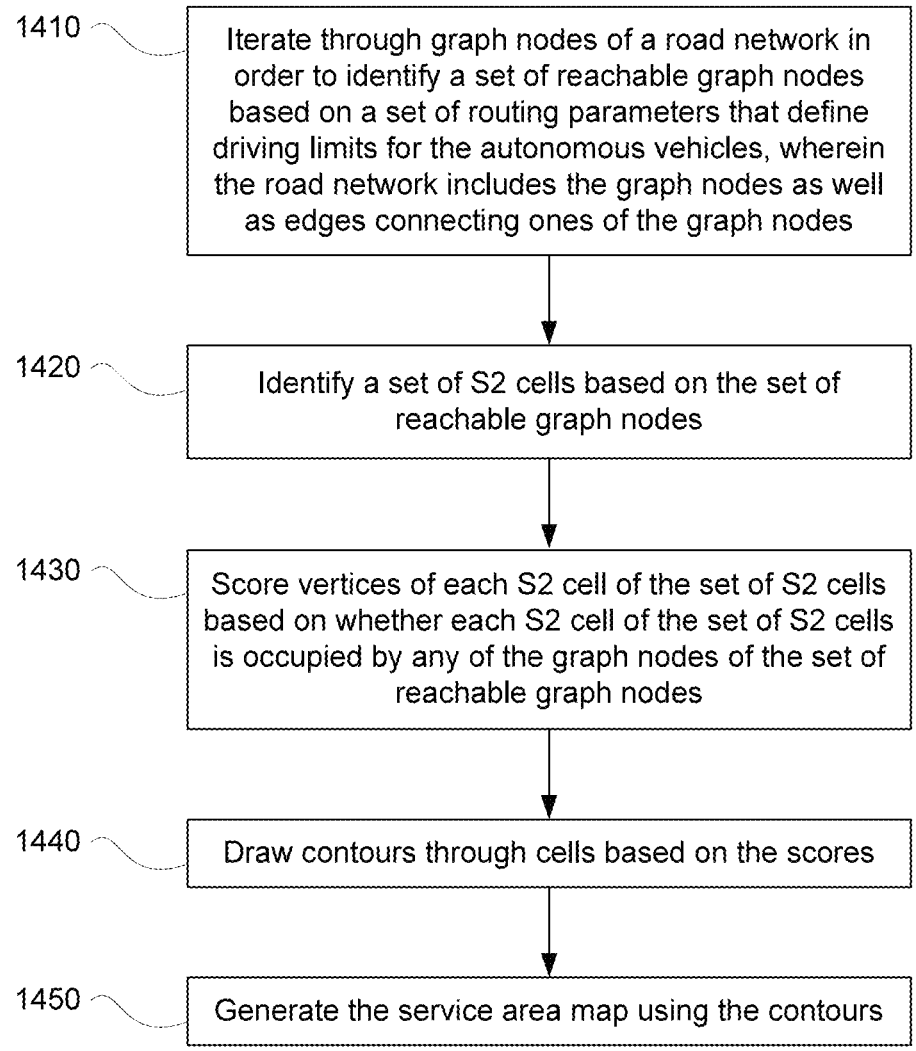
FIG. 14 is an example flow diagram in accordance with aspects of the disclosure.

FIG. 14 provides an example flow diagram 1400 for generating a service area map for autonomous vehicles which may be performed by one or more processors of one or more computing devices such as the processors of server computing devices 410. At block 1410, graph nodes of a road network are iterated through in order to identify a set of reachable graph nodes based on a set of routing parameters that define driving limits for the autonomous vehicle. The road network includes the graph nodes as well as edges connecting ones of the graph nodes. As noted above, an automated process may begin by producing a set of graph nodes on a road network (such as the road network corresponding to the map information 200 depicted in FIG. 2B) that are reachable given a set of routing parameters.

To determine which graph nodes are reachable, the server computing devices 410 may iterate through all of the graph nodes in the road network, and for each graph node, identify every other graph node that is reachable from that graph node. Reachability may be limited by routing parameters which may define the limits of the autonomous vehicles themselves (e.g. vehicle 100) rather than the road network itself. As one example, a routing parameter may include an ability to reach the same graph node from all other graph nodes. In other words, graph nodes are only reachable in the road network if they can be returned back from another graph node. In this regard, a dead-end would not include reachable graph nodes. Another example routing parameter may include avoiding certain types of driving maneuvers such as unprotected turns, double left turning lanes, U-turns, turning lanes which are shared with on-coming traffic, reversing maneuvers, turns over certain lane boundaries (over a double-yellow), etc. Another example routing parameter may include avoiding certain areas of the road network such as hills of a particular grade, rail-road crossings, roads with certain speed limits (i.e. greater than 40 miles per hour), etc.

Figure 6A:
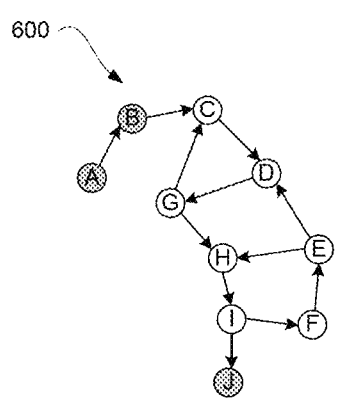
FIG. 6A is an example of a group of graph nodes of a road network in accordance with aspects of the disclosure.
Figure 6B:
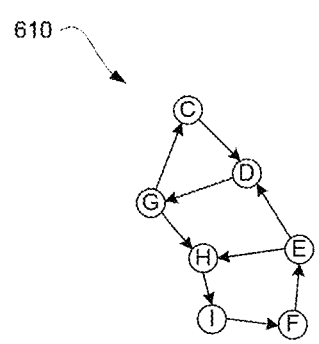
FIG. 6B is an example of a partition in accordance with aspects of the disclosure.
Figure 7A:
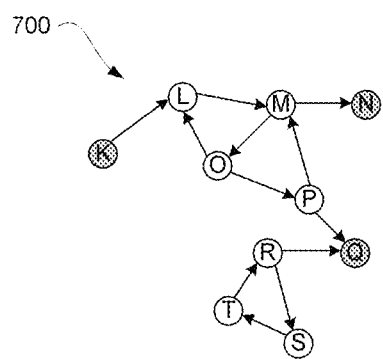
FIG. 7A is an example of a group of graph nodes of a road network in accordance with aspects of the disclosure.
Figure 7B:
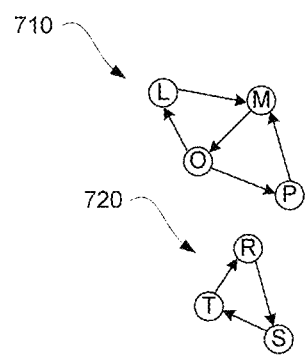
FIG. 7B is an example of partitions in accordance with aspects of the disclosure.

The end result may be partitioned sets of reachable graph nodes which may represent a possible service area for a fleet of autonomous vehicles. FIGS. 6A and 7A represent two example groups of nodes corresponding to graph nodes and edges from two geographic areas 600, 700, and FIGS. 6B and 7B represent two example partitions 610, 710 for the groups of nodes for areas 600, 700. Although these groups include very few nodes, this is for ease of representation and demonstration. Groups of nodes may correspond to whole neighborhoods, towns, cities, counties, states, countries, etc. Turning to the example of FIG. 6A, geographic area 600 includes 10 graph nodes A-J and various edges (represented by arrows) between these graph nodes. Because of the directions of the various edges, graph nodes A, B, and J are each not reachable from the other graph nodes. As such, these nodes may be excluded in order to form partition 610 of graph nodes depicted in FIG. 6B. In this regard, the partition 610 may represent a possible service area for the aforementioned fleet of vehicles.

Turning to the example of FIG. 7A, geographic area 700 includes 10 graph nodes K-T and various edges (represented by arrows) between these graph nodes. Because of the directions of the various edges, graph nodes K, N, and Q are each not reachable from the other nodes. As such, these graph nodes may be excluded in order to form partitions 710, 720 of graph nodes depicted in FIG. 7B. In this regard, each of the partitions 710, 720 may represent a possible service area for the aforementioned fleet of vehicles.

Figure 8:
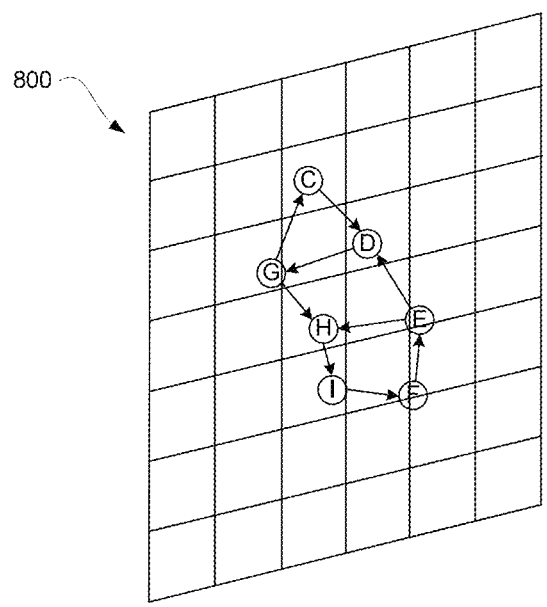
FIG. 8 is an example of a partition and a grid of S2 cells in accordance with aspects of the disclosure.

Returning to FIG. 14, at block 1420, a set of S2 cells are identified based on the set of reachable graph nodes. The result of the iterations may be one or more sets of reachable graph nodes (and edges) each corresponding to a different possible service area for the autonomous vehicles. In order to generate a map representative of these different possible service areas, each set of reachable graph nodes may be processed to identify the extreme graph nodes, or rather, a subset of the set of reachable graph nodes having the most maximum and minimum latitudes and longitudes. These extreme graph nodes may be used to identify cells for an area of a grid of S2 cells corresponding to the set of reachable graph nodes. The level of the S2 cells used may depend upon the level of detail required or desired for a map of the service area corresponding to the set of reachable graph nodes. In this regard, given the use of S2 cells, the resolution of the map of the service area may be increased or decreased as needed. FIG. 8 represents a set of S2 cells 800 for the area corresponding to the partition 610. This set of S2 cells, although depicted as an "empty" grid actually represent the map tiles for a geographic area corresponding to the locations of the graph nodes of partition 610.

Figure 9:
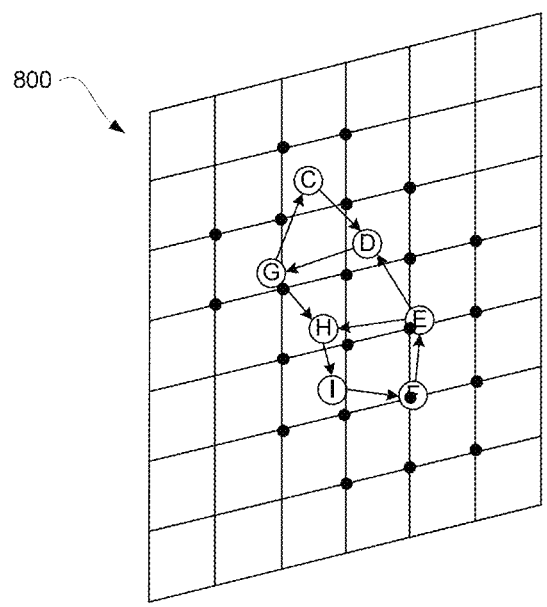
FIG. 9 is an example of a grid of S2 cells and scored vertices in accordance with aspects of the disclosure.

Returning to FIG. 14, at block 1430, vertices of each S2 cell of the set of S2 cells are scored based on whether each S2 cell of the set of S2 cells is occupied by any of the graph nodes of the set of reachable graph nodes. Each vertex of the grid may be scored or assigned a numerical value based on whether the cell to which the vertex belongs includes a graph node or an edge. For example, all vertices may initially be valued at zero. If there is an edge or a graph node within the cell, the value for the vertices of that cell may be increased by some arbitrary number, such as 1 or 0.1, etc. The result may be a grid of cells which identifies which cells are occupied (values greater than 0) and which cells are unoccupied (values equal to 0). FIG. 9 depicts the set of S2 cells 800 with each of the vertices which would have non-zero values represented by black circles. As can be seen, each S2 cell having a graph node of the partition 610 therein has each of its vertices represented by a black circle to indicate that the cell having those vertices is occupied by at least one of the graph nodes. Alternatively, different initial values may be used, and/or rather than increasing values, values may be decreased (e.g. go negative).

Returning to FIG. 14, at block 1440, contours are drawn through S2 cells of the set of S2 cells based on the scores. Contour lines may be drawn on the S2 cells having a heterogeneous mix of positive and non-positive vertices so as to separate the two types of vertices. In other words, the contour lines may be drawing to divide cells to separate non-zero values from zero or negative values.

Figure 10:
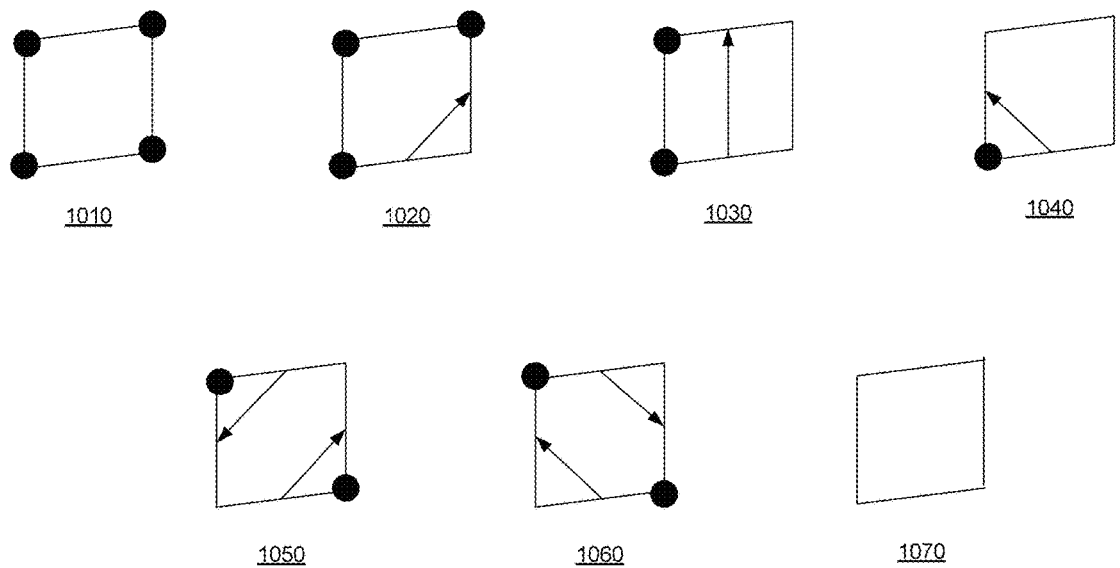
FIG. 10 is a series of examples of drawing contours in accordance with aspects of the disclosure.

FIG. 10 depicts a series of examples of contour lines for cells with different combinations of positive and non-positive vertices. In this example, vertices with positive weights are represented by black circles, while vertices with non-positive weights are not. Example 1010 includes a cell with 4 positive vertices, and as such, no contour line is drawn. Example 1020 includes a cell with 3 positive vertices, so a contour line is drawn to separate these three vertices from the non-positive vertex. Example 1030 includes a cell with 2 positive vertices which are directly adjacent to one another, so a contour line is drawn to separate these two positive vertices from the non-positive vertices by dividing the cell in half. Example 1040 includes a cell with a single positive vertex, so a contour line is drawn to separate this vertex from the three non-positive vertices. Example 1050 includes a cell with 2 positive vertices. However, unlike example 1030, these vertices are not directly adjacent to one another, so two contour lines are drawn to separate each of the two positive vertices from the non-positive vertices. Example 1060 includes a cell with 2 positive vertices. Like example 1050, these vertices are not directly adjacent to one another, so two contour lines are drawn to separate each of the two positive vertices from the non-positive vertices. Example 1070 includes a cell with 4 non-positive vertices, and as such, no contour line is drawn.

The contour lines may start and end at the mid points (or half-way points) of the edges between two vertices in each S2 cell as approximately depicted in the examples of FIG. 10. Alternatively, rather than using the mid points, the server computing devices 410 may linearly interpolate along each S2 cell's edge to determine where a contour line should start or end. This interpolation may be set so that the contour lines more closely hug the positively scored vertices. This may be especially useful when using larger S2 cells (lower resolution, lower level, and higher average cell area), and less so when smaller S2 cells (higher resolution, higher level, and lower average cell area). In some instances, this interpolation may result in more aesthetically pleasing service area maps.

Alternatively, if rather than increasing values, values are decreased when scoring vertices, negative values may be separated from zero or positive values in a similar way. In this regard, returning to the examples of FIG. 10, the black circles would simply represent negative values and the other vertices would represent zero or positive values, and the contours would still be drawn the same way.

Figure 11:
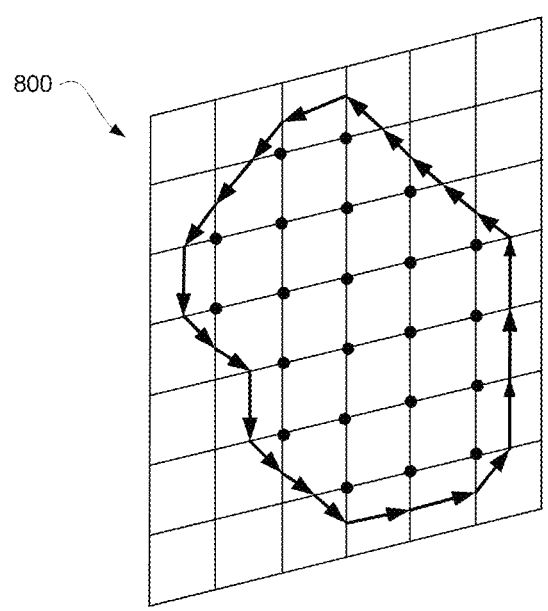
FIG. 11 is an example of a grid of S2 cells, scored vertices, and contours in accordance with aspects of the disclosure.
Figure 12:
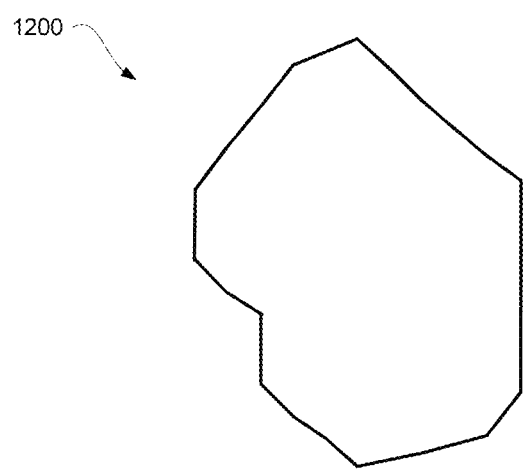
FIG. 12 is an example of a polygon representing map tiles for a service area in accordance with aspects of the disclosure.

Returning to FIG. 14, at block 1450, a service area map is drawn using the contours. The contour lines may be joined to one another in order to form polygons that encompass a service area. FIG. 11 is an example of the contour lines for the set of S2 cells 800 and partition 610 from FIG. 9. By joining these contour lines, a polygon 1200 may be formed as depicted in FIG. 12. This polygon may represent a service area for the partition and although not shown, includes any portions of the map tiles of the S2 cells encompassed within the polygon. Thus, FIG. 12 represents a map of a service area for autonomous vehicles.

Rules or heuristics may be used to determine which side of a cell should be included in the polygon or not included. For example, contour lines may be drawn in directions such that higher values (or lower values) are always to the left (as shown in the examples of FIG. 10) or always to the left of the contour line, and all connected contour lines may be connected so as to follow the same direction. As shown in the examples of FIG. 10, each contour line has a direction represented by arrow heads. For example, comparing example 1050 to example 1060, the directions of the contour lines are opposite one another given the positions of the non-positive vertices relative to the positions of the positive vertices. As shown in FIG. 11, all of the contour lines connect to one another following the same direction.

This may enable the server computing devices to identify "islands" within a service area where an autonomous vehicle is unable to reach. In other words, such islands would include S2 cells which do not include any graph nodes of a partition within them. As such, the road network may include graph nodes in these areas, but they may be excluded from a partition for other reasons, such as because these graph nodes are not reachable from all other graph nodes or are limited by the aforementioned routing parameters and therefore are excluded from the partition.

Figure 13A:
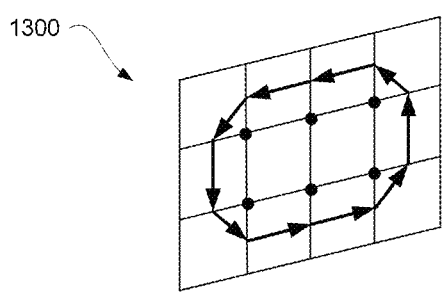
FIG. 13A is an example of a grid of S2 cells, scored vertices, and contours in accordance with aspects of the disclosure.
Figure 13B:
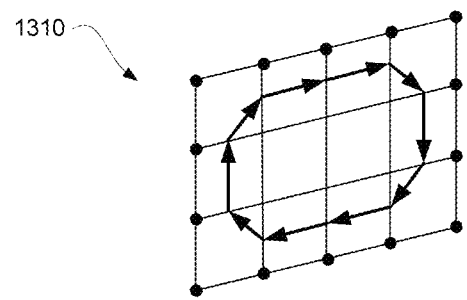
FIG. 13B is another example of a grid of S2 cells, scored vertices, and contours in accordance with aspects of the disclosure.

For example, as shown in example 1300 of FIG. 13A, the contour lines form a polygon around positive vertices forming a service area. The arrows in this example extend clockwise around the polygon. However, as shown in example 1300 of FIG. 13B, the contour lines form a polygon around non-positive vertices forming an island within a larger service area (not shown) where the vehicle is unable to reach. The arrows in this example extend counter-clockwise around the polygon. In this regard, the direction may define whether or not the polygon is a service area or an island. If contour lines are drawn in directions such that higher values are always to the right, the directions of all of the arrows (or positions of the arrow heads) of FIG. 10 would be reversed. As such, the direction of the arrows in each of the examples 1300, 1310 would be reversed (clockwise would become counter-clockwise and vice versa). However, example 1300 would still depict a service area, and example 1310 would still depict an island.

Figure 13C:
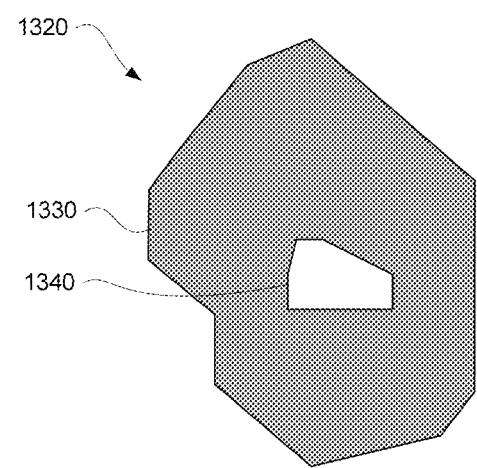
FIG. 13C an example of a plurality of polygons representing map tiles for a service area in accordance with aspects of the disclosure.

FIG. 13C represents a service area 1320 formed from a plurality of polygons generated by connecting contour lines as in the examples above. As in the example of FIG. 12, service area 1320 represents a portion of map tiles of S2 cells corresponding to this service area though this information is not depicted. In this example, a first polygon 1330 represents an outer boundary of a service area, and a second polygon 1340 represents an island within the service area where an autonomous vehicle would not be permitted to drive. In this regard, the shaded area between the two polygons represents a drivable area of the service area (or rather, where the vehicles of the fleet are able to drive) and the area within the second polygon 1340 is excluded or outside of the service area.

In order to keep some areas as always off limits to the autonomous vehicles, in some instances, vertices of cells of these areas may be fixed to the default value or some largely negative (or positive) value. This may be especially useful to enforcing certain policies such as always avoiding school zones, etc.

In some instances, the service areas may be refined to improve their visual appeal. For example, contour lines may be curved or adjusted to avoid overlapping with other roads which are not within the service area. This may be done automatically (e.g. mathematically) or by a human operator. For example, either process may involve trying to simplify the contour by iteratively deleting points on the polygon and measuring the distance from the deleted point to the original polygon or the "distance error". Removed points that minimize the distance error from the original polygon may be removed. This may be repeated until the distance error is sufficiently large, or the contour has been sufficiently simplified (e.g. a maximum number of iterations have been performed).

The server computing devices may rerun this process periodically or in response to the graph nodes and/or the scoping restrictions being updated in order to provide updated service area maps. This may enable operators to understand how changes to the graph nodes and/or the scoping restrictions, such as by removing an intersection or a turn, can affect service areas and may be used to raise an early flag to prevent making changes that may significantly decrease the vehicle's ability to operate in an existing or prior service area. In addition, operators may be able to more readily identify problematic areas of the service areas which may enable the operators to find out ways to expand the service area. For instance, if a certain type of maneuver at a particular location prevents the autonomous vehicles from reaching a larger service area, operators may enable this maneuver at that particular location.

The features described herein may provide for a useful and practical approach to automatically determining service areas for autonomous vehicles. The resulting maps of service areas may then be used to help human operators as well as users of the service to better understand these service areas. In addition, the automated process described herein can be run anytime there is a change, which may not only improve the reliability of maps used by a transportation service, but may also enable operators to understand how changes to the graph nodes and/or the scoping restrictions can affect service areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating a service area map for autonomous vehicles, the method comprising:
   iterating, by one or more processors, through graph nodes of a road network in order to identify a set of reachable graph nodes based on a set of routing parameters that define driving limits for the autonomous vehicles, wherein the road network includes the graph nodes as well as edges connecting ones of the graph nodes;
   identifying, by the one or more processors, a set of S2 cells based on the set of reachable graph nodes, wherein each S2 cell has an area with a curved surface defined at one or more levels of granularity associated with an average cell size;
   scoring, by the one or more processors, vertices of each S2 cell of the set of S2 cells based on whether each S2 cell of the set of S2 cells is occupied by any of the graph nodes of the set of reachable graph nodes;
   drawing, by the one or more processors, contours through cells based on the scoring of the vertices; and
   generating, by the one or more processors, the service area map using the contours, wherein the service area map provides information on how the routing parameters affect an ability of the autonomous vehicles to operate in an existing or prior service area.

2. The method of claim 1, wherein the set of routing parameters include an ability to reach one graph node of the set of reachable graph nodes from all other graph nodes of the set of reachable graph nodes.

3. The method of claim 1, wherein the set of routing parameters includes avoiding certain driving maneuvers.

4. The method of claim 1, wherein the set of routing parameters includes avoiding certain areas of the graph nodes.

5. The method of claim 1, wherein identifying the set of S2 cells includes identifying a subset of the set of the reachable graph nodes having extreme latitude and longitude values.

6. The method of claim 1, wherein scoring vertices includes:
   initially setting all vertices of each S2 cell of the set of S2 cells to a first value; and
   adjusting values of any vertices of S2 cells of the set of S2 cells that are occupied by any graph nodes of the set of reachable graph nodes.

7. The method of claim 6, wherein drawing the contours includes dividing a cell of the set of S2 cells by dividing vertices with the first value from vertices of adjusted values.

8. The method of claim 7, wherein drawing the contours includes drawing a contour with a particular direction to indicate which portion of the divided cell includes vertices of the first value and which portion of the divided cell includes vertices of adjusted values.

9. The method of claim 1, wherein the service area map includes a plurality of polygons.

10. The method of claim 9, wherein a first one of the plurality of polygons includes an excluded area within a second one of the plurality of polygons, such that an area between the first one and the second one is a drivable area.

11. A system for generating a service area map for autonomous vehicles, the system comprising one or more processors configured to:
    iterate through graph nodes of a road network in order to identify a set of reachable graph nodes based on a set of routing parameters that define driving limits for the autonomous vehicles, wherein the road network includes the graph nodes as well as edges connecting ones of the graph nodes;
    identify a set of S2 cells based on the set of reachable graph nodes, wherein each S2 cell has an area with a curved surface at one or more levels of granularity associated with an average cell size;
    score vertices of each S2 cell of the set of S2 cells based on whether each S2 cell of the set of S2 cells is occupied by any of the graph nodes of the set of reachable graph nodes;
    draw contours through cells based on the scores of the vertices; and
    generate the service area map using the contours, wherein the service area map provides information on how the routing parameters affect an ability of the autonomous vehicles to operate in an existing or prior service area.

12. The system of claim 11, wherein the set of routing parameters include an ability to reach one graph node of the set of reachable graph nodes from all other graph nodes of the set of reachable graph nodes.

13. The system of claim 11, wherein the set of routing parameters includes avoiding certain driving maneuvers.

14. The system of claim 11, wherein the set of routing parameters includes avoiding certain areas of the graph nodes.

15. The system of claim 11, wherein identifying the set of S2 cells includes identifying a subset of the set of the reachable graph nodes having extreme latitude and longitude values.

16. The system of claim 11, wherein the one or more processors are further configured to score vertices by:
   initially setting all vertices of each S2 cell of the set of S2 cells to a first value; and
   adjusting values of any vertices of S2 cells of the set of S2 cells that are occupied by any graph nodes of the set of reachable graph nodes.

17. The system of claim 16, wherein the one or more processors are further configured to draw the contours by dividing a cell of the set of S2 cells by dividing vertices with the first value from vertices of adjusted values.

18. The system of claim 17, wherein the one or more processors are further configured to draw the contours by drawing a contour with a particular direction to indicate which portion of the divided cell includes vertices of the first value and which portion of the divided cell includes vertices of adjusted values.

19. The system of claim 11, wherein the service area map includes a plurality of polygons.

20. The system of claim 19, wherein a first one of the plurality of polygons includes an excluded area within a second one of the plurality of polygons, such that an area between the first one and the second one is a drivable area.

21. The method of claim 1, further comprising updating, by the one or more processors, the graph nodes in order to provide an updated service area map, wherein the updated service area map indicates how changes to the graph nodes affects the ability of the autonomous vehicles to operate in the existing or prior service area.

22. The system of claim 11, wherein the one or more processors are further configured to update the graph nodes in order to provide an updated service area map, wherein the updated service area map indicates how changes to the graph nodes affects the ability of the autonomous vehicles to operate in the existing or prior service area.

\* \* \* \* \*